United States Patent Office 3,121,709
Patented Feb. 18, 1964

3,121,709
RESINOUS REACTION PRODUCTS DERIVED FROM LIGNINS
Lothar Engelmann, Sudbury, Mass., assignor to Chemtan Company, Exeter, N.H., a partnership of New Hampshire
No Drawing. Filed Aug. 22, 1960, Ser. No. 50,855
15 Claims. (Cl. 260—124)

This invention relates to the preparation of novel chemical compounds, and particularly to novel resinous reaction products prepared from certain lignin materials. The compounds referred to can be described in general as the reaction products of an alkali lignin with a resin-forming amino compound, a salt of an aromatic sulfonic acid and formaldehyde.

The alkali lignins are believed to be of value for certain industrial purposes because of the presence in their molecules of free hydroxyl groups and also because of the substantial absence of sulfo groups. However, they have been found to have the disadvantage of being insoluble in water under even slightly acid conditions. As part of the experimentation leading to the present invention, attempts were made to render the alkali lignin soluble in the presence of acid by reacting it with aromatic sulfonic acids. To accomplish this the alkali lignin was refluxed in aqueous alkaline solution with aromatic sulfonic acids, such as the sodium salt of sulfanilic acid. However, continued refluxing did not prevent precipitation occurring immediately upon the addition of diluted acetic acid to the diluted reaction mixture. A similar attempt was made to interact alkali lignin with formaldehyde, and it was likewise found that immediate precipitation occurred under the same conditions. In fact this reaction resulted in the formation of a product of much higher viscosity, which showed even less solubility in water than the alkali lignin alone.

According to the present invention it is possible to obtain water-soluble reaction products which are substantially acid stable upon dilution with water by interacting in aqueous alkaline solution an alkali lignin with a resin-forming amino compound of the type selected from the group consisting of melamine, guanylurea, guanidine, urea and dicyandiamide; a salt of an aromatic sulfonic acid and formaldehyde in certain specified proportions, and heating the mixture together under reflux. If the reaction is carried out by reacting a predetermined amount of alkali lignin with one mol of the amino compound, and at least one mol of the sulfonic acid salt and two mols of formaldehyde, water-soluble products are obtained which after dilution with water do not immediately precipitate upon the addition of acid, such as acetic acid or formic acid. However, by increasing the amount or ratio of formaldehyde, products are obtained which precipitate more readily in the presence of acid. For example, in the case of products obtained by reacting a given amount of alkali lignin with one mol of the amino compound, two mols of formaldehyde and one mol of the sulfonic acid salt, the addition of formic acid did not produce a precipitate immediately; whereas the products prepared in the same way but with the use of 3 mols of formaldehyde precipitated slightly, and products prepared with 4 mols of formaldehyde produced a distinct precipitatae under the same condition.

While the mechanism of the above reaction is not completely understood, it is believed that under conditions of reflux the various additives condense or couple together, largely due to the presence of the formaldehyde as a condensing or coupling agent, and as a result compounds are formed in which the alkali lignin, amino compound, formaldehyde and the aromatic sulfonic acid salt are reacted and combined. The products obtained were stable solutions which, after dilution, precipitated only at relatively low pH values upon the addition of acid.

The alkali lignins employed are derived from the manufacture of paper pulp by the sulfate process. A typical alkali lignin material suitable for the purposes of this invention is prepared in a variety of forms by the Polychemicals Division of the West Virginia Pulp and Paper Company and sold under the trademark "Indulin." Certain of these products are insoluble in water, but are soluble in aqueous alkali. Others are prepared in the form of sodium derivatives, which are soluble in water since they form an alkaline solution without adding alkali. Thus, the various forms of Indulin differ from each other primarily in alkalinity, and can be used interchangeably in their alkaline form or in alkaline solution. In general, the alkali lignins are naturally occurring polymers, characterized by a series of closely linked benzene, pyrane and furane rings carrying methoxyl, hydroxyl and other substituent groups. The particular alkali lignin known as "Indulin" is manufactured under conditions that insure a uniform product completely free of wood sugars and similar wood degradation products, and has the following characteristics:

| | |
|---|---|
| Methoxy groups _____percent__ | 13.9 |
| Hydroxy groups _____do____ | 14.5 |
| Calculated molecular weight based on 4 methoxy groups _____ | 840 |
| Number of methoxy groups per 840 unit _____ | 4 |
| Number of hydroxy groups _____ | 8 |
| Ash _____percent__ | 0.5–23 |
| Moisture _____do____ | 3–9 |

While a wide variety of salts of aromatic sulfonic acids can be used to make the reaction products of this invention, I preferably employ an alkali salt of a naphthol sulfonic acid or of an amino sulfonic acid of the benzene or naphthalene series. Suitable compounds for this purpose include, for example, the sodium, potassium and ammonium salts of sulfanilic acid, naphthionic acid, O-naphthionic acid, 5-amino-1-naphthalene sulfonic acid, 1-naphthol-4-sulfonic acid, and 2-naphthol-6-sulfonic acid.

Suitable amino compounds for the purposes of this invention include melamine, guanylurea, guanidine, urea, and dicyandiamide, and other similar resin-forming amino compounds. The formaldehyde employed in the reaction can be used in various forms also. However, it is preferable to employ the aldehyde in the form of paraformaldehyde.

The reactions are in general carried out by charging the materials into a three necked flask equipped with stirrer, reflux condenser and thermometer, heating the materials to reflux and refluxing for about 2 hours or more. Similar reactions have been described in a copending application, but in which the resin-forming amino compound was omitted. By using such amino compounds along with the alkali lignin, the sulfonic acid salt and formaldehyde in accordance with the present invention, it is believed that products of increased molecular size and different properties are formed, in which the formaldehyde serves to condense and unite both the alkali lignin and the resin-former, and the resin-former and the salt of the aromatic sulfonic acid.

The effect of reacting the several ingredients in various proportions can be readily ascertained from the following table, in which the results of several tests are tabulated. The materials were in each instance charged into a three necked flask equipped with stirrer, reflux condenser and thermometer, heated to reflux and refluxed for 3 hours. In each case the sodium salt of alkali lignin was reacted with dicyandiamide, sodium sulfanilate and paraformaldehyde. The particular sodium salt of alkali lignin used in these tests was a product sold by the West Virginia Pulp and Paper Company under the trademark "Indulin C," which has the characteristics hereinbefore stated and also an average impurities content of 25%. Inasmuch as the molecular weight of the alkali lignins, including "Indulin C," is a matter of conjecture, the products represented by this table were of necessity obtained by reacting a predetermined amount in grams of the sodium salt of alkali lignin with molar quantities of the other reactants. Since the paraformaldehyde was 91% pure, one mol would be contained in 33 grams of the aldehyde. The molecular weight of sodium sulfanilate containing $2H_2O$ is 231.2.

TABLE I

| Test Number | 1 | 2 | 3 |
|---|---|---|---|
| Water_____grams__ | 200 | 200 | 200 |
| Sodium Salt of alkali lignin_____do__ | 80 | 80 | 80 |
| pHCHO_____do__ | 11.3 | 16.9 | 22.5 |
| pHCHO_____mols__ | 3/8 | 9/10 | 3/4 |
| Sodium sulfanilate_____grams__ | 43.1 | 43.1 | 43.1 |
| Do_____mols__ | 3/16 | 3/16 | 3/16 |
| Dicyandiamide_____grams__ | 15.7 | 15.7 | 15.7 |
| Do_____mols__ | 3/16 | 3/16 | 3/16 |
| Reflux time_____hours__ | 3 | 3 | 3 |
| Ratio of grams of lignin to mols of dicyandiamide to mols of pHCHO and mols of sulfanilate [1] | X:1:2:1 | X:1:3:1 | X:1:4:1 |
| Consistency | [2] | [2] | [2] |
| Precipitation pH[3] | 1.95 | 2.3 | 3.6 |

[1] X equals 426 grams of the sodium salt of alkali lignin.
[2] Viscous liquid.
[3] 100 milliliters of a 5% solution of each reaction product in water was titrated with 4 N formic acid until the solution clouded. The results were accurate within the range of + or −0.2 pH.

In the tests shown in Table I the materials were all charged into the reaction flask together. In the tests shown in the following table, on the other hand, the materials were charged separately, or in stages, and in varying order, and then were refluxed for one hour after each charge. In each instance also the proportion of the reactants used was the same.

ucts which are less soluble in the presence of acid than those containing only two molar proportions of the aldehyde. Likewise the degree of solubility of the products in water in the presence of acid varies in accordance with the procedure used in charging the reactor. Thus, the precipitation pH varied from about 3.6 to less than 1.9, depending on the method employed.

In a further test similar to test number 8, it was found that if the sodium sulfanilate and the sodium salt of alkali lignin were first reacted with one mol of paraformaldehyde for one hour prior to being added to the reaction product of one mol of dicyandiamide and four mols of paraformaldehyde, the end product is more acid sensitive than any of the other products tested. Thus, the products prepared in this way with an end molar ratio of 1 mol of sodium sulfanilate to 1 mol of dicyandiamide to 5 mols of paraformaldehyde to 426 grams of the sodium salt of alkali lignin precipitated in the pH range of 3.4 to 3.8 as compared with 1.9 (or lower) to less than 3.0 for most of the other products.

A further understanding of the invention will be obtained from the following examples of methods of preparing water soluble reaction products suitable for the purposes of this invention.

*Example I*

200 milliliters of water, 80 grams of alkali lignin (Indulin C), 43 grams of sodium sulfanilate crystals, 15.7 grams of melamine and 11.3 grams of paraformaldehyde were charged to a 3 necked flask equipped with a stirrer, reflux condenser and thermometer. The mixture was brought to reflux and reflux for 3 hours. After cooling to room temperature this solution had a pH value of about 9, was of syrupy consistency, free of formalin odor and dilutible with water in any ratio. It remained stable for at least 9 months, and when diluted did not precipitate until sufficient formic acid was added to bring the solution to a pH of 1.9.

TABLE II

| Test Number | 4 | 5 | 6 | 7 | 8 |
|---|---|---|---|---|---|
| Water_____grams__ | 200 | 200 | 200 | 200 | 200. |
| Sodium salt of alkali lignin____do__ | 80 | 80 | 80 | 80 | 80. |
| pHCHO_____do__ | 22.5 | 22.5 | 22.5 | 22.5 | 22.5. |
| pHCHO_____mols__ | 3/4 | 3/4 | 3/4 | 3/4 | 3/4. |
| Sodium sulfanilate_____grams__ | 43.1 | 43.1 | 43.1 | 43.1 | 43.1. |
| Do_____mols__ | 3/16 | 3/16 | 3/16 | 3/16 | 3/16. |
| Dicyandiamide_____grams__ | 15.7 | 15.7 | 15.7 | 15.7 | 15.7. |
| Do_____mols__ | 3/16 | 3/16 | 3/16 | 3/16 | 3/16. |
| Charge procedure | 1. $H_2O$ + lignin + pHCHO. 2. Sulfanilate. 3. Dicyandiamide. | 1. $H_2O$ + lignin + pHCHO. 2. Dicyandiamide. 3. Sulfanilate. | 1. $H_2O$ + pHCHO + sulfanilate. 2. Lignin. 3. Dicyandiamide. | 1. $H_2O$ + pHCHO + sulfanilate. 2. Dicyandiamide. 3. Lignin. | 1. Dicyandiamide + pHCHO (50% solution in $H_2O$). 2. Sulfanilate. 3. $H_2O$ + lignin. |
| Reflux time | 1 hour after each charge; 3 hours total. | 1 hour after each Charge; 3 hours total. | 1 hour after each charge; 3 hours total. | 1 hour after each charge; 3 hours total. | 1 hour after each charge; 3 hour total. |
| Ratio of grams of lignin to mols of dicyandiamide to mols of pHCHO and mols of sulfanilate | X:1:4:1 | X:1:4:1 | X:1:4:1 | X:1:4:1 | X:1:4:1. |
| Consistency | Viscous liquid | Viscous liquid | Viscous liquid | Viscous liquid | Viscous liquid. |
| Precipitation pH | 2.5 | 2.8 | >1.9 | 1.9 | 3.4 |

The value of X in the ratios of Table II is the same as defined at the bottom of Table I. Likewise, the precipitation pH values in Table II were determined in the manner described at the bottom of Table I.

The results as shown in Tables I and II indicate that products which are substantially stable in the presence of acid can be obtained by reacting 426 grams of the alkali lignin with one mol of dicyandiamide and at least two mols of paraformaldehyde and one mol of sodium sulfanilate. Thus, when proportions such as these are used, the reaction products do not precipitate in the presence of acids, such as acetic acid or formic acid, until the solution has a pH value of about 3.6 or lower. It is also to be noted that an increase in the relative amount of paraformaldehyde used in the reaction results in prod-

*Example II*

250 milliters of water, 80 grams of alkali lignin (Indulin C), 15 grams of urea and 15 grams of paraformaldehyde were charged to a 3 necked flask equipped with a stirrer, reflux condenser and thermometer. The mixture was brought to reflux and refluxed for 1 hour. 43.5 grams of sodium sulfanilate crystals and 5.7 grams of additional paraformaldehyde were then added, and the mixture was refluxed for another 2 hours, after which the solution was cooled. The reaction product was of syrupy consistency, had a pH value of 8.6 and was free of formalin odor. It remained stable for at least 1 month and was capable of being diluted with water in any ratio. A diluted solution of the reaction product did not precipitate until sufficient formic acid was added to bring the solution to a pH of 2.3.

Example III 200 milliliters of water, 80 grams of alkali lignin (Indulin C), 11.3 grams of paraformaldehyde, 43.5 grams of sodium sulfanilate crystals, 15.8 grams of dicyandiamide were charged to a reaction flask, refluxed and further treated as described in Example I. The resulting solution had a pH valve of about 9, was of syrupy consistency and also possessed other properties of the product described in Example I.

Example IV 200 milliliters of water, 80 grams of alkali lignin (Indulin C), 43 grams of sodium sulfanilate crystals, 15.7 grams of dicyandiamide and 22.5 grams of paraformaldehyde were charged to a reaction flask, refluxed and further treated as in Example I. The resulting solution displayed the same properties as the product of Example I except that a precipitate was formed upon the addition of formic acid of a pH of 3.6.

Example V 200 milliliters of water, 80 grams of the sodium salt of alkali lignin (Indulin C), 43.8 grams of sodium naphthionate, 15.7 grams of melamine and 11.3 grams of paraformaldehyde were charged to a 3 necked flask equipped as in Example I, and refluxed for 3 hours, after which the solution was cooled to room temperature and bottled. The resulting solution had the same properties as the reaction product described in Example I.

Example VI 250 milliliters of water, 7.5 grams of NaOH, 73.8 grams of raw 1-naphthol-4-sulfonic acid (58.8%), 80 grams of alkali lignin (Indulin C), 15.7 grams of melamine and 11.3 grams of paraformaldehyde were charged to a 3 necked flask equipped as in Example I, and refluxed for 3 hours, cooled to room temperature and bottled. The resulting solution had the same properties as the reaction product described in Example II.

The alkali lignin used in the above examples is known in the trade as Indulin C, which is prepared in the form of the sodium salt and is therefore soluble in water. Insoluble forms of alkali lignin, such as the pure form of alkali lignin known as "Indulin A," may also be used, if a small amount of alkali is added to the reaction mixture.

The resinous reaction products prepared as described above are useful in the treatment of penetrable materials, such as tanned leather, fabrics and paper. For example, shaved chrome-tanned leather was first washed for 10 minutes at 140° F., and drained. It was then floated in 100% water at 140° F., after which 5% (based on the solids content) of one of the products referred to in table I diluted in 25% water at 140° F., was added, and the leather was drummed for 60 minutes, and drained. It was then washed 5 minutes at 130° F., drained, and then floated in 100% water at 130° F. A conventional fatliquor in 25% water at 130° F. was then added, after which the treated leather was drummed 45 minutes, or until the fatliquor was exhausted, horsed up and air dried.

When samples of chrome-tanned leather were treated with the products of tests 1, 2 and 3 (Table I), the following results were noted.

The leathers treated as described above were full, somewhat firm, and had a medium smooth grain, a tight break, and showed good plumping. Cloth and paper treated with these products had increased body or feel, increased strength and the decreased tendency to absorb moisture.

While the water soluble reaction products which do not precipitate in the presence of acids until the pH value is lowered to at least 6, or in some instances as low as 1.9, or even lower, are particularly useful in the previously mentioned industrial fields, the neutral or alkaline water soluble reaction products of this invention, which precipitate immediately in the presence of acids, are also useful as impregnation agents, and can be used to advantage in the treatment of fabrics, paper and other similar materials.

What I claim is:

1. The water-soluble reaction product obtained by interacting in an alkaline water solution an alkali lignin with an amino compound selected from the group consisting of melamine, guanylurea, guanidine, urea and dicyandiamide; formaldehyde, and a substance selected from the group consisting of alkali salts of naphthol sulfonic acids and alkali salts of amino sulfonic acids of the benzene and naphthalene series, and heating the aqueous reaction mixture under reflux.

2. The water-soluble reaction product obtained by interacting in an alkaline water solution alkali lignin with melamine, formaldehyde and a substance selected from the group consisting of alkali salts of naphthol sulfonic acids and alkali salts of amino sulfonic acids of the benzene and naphthalene series, and heating the aqueous reaction mixture under reflux.

3. The water-soluble reaction product obtained by interacting in an alkaline water solution alkali lignin with guanylurea, formaldehyde and a substance selected from the group consisting of alkali salts of naphthol sulfonic acids and alkali salts of amino sulfonic acids of the benzene and naphthalene series, and heating the aqueous reaction mixture under reflux.

4. The water-soluble reaction product obtained by interacting in an alkaline water solution alkali lignin with guanidine, formaldehyde and a substance selected from the group consisting of alkali salts of naphthol sulfonic acids and alkali salts of amino sulfonic acids of the benzene and naphthalene series, and heating the aqueous reaction mixture under reflux.

5. The water-soluble reaction product obtained by interacting in an alkaline water solution alkali lignin with urea, formaldehyde and a substance selected from the group consisting of alkali salts of naphthol sulfonic acids and alkali salts of amino sulfonic acids of the benzene and naphthalene series, and heating the aqueous reaction mixture under reflux.

6. The water-soluble reaction product obtained by interacting in an alkaline water solution alkali lignin with dicyandiamide, formaldehyde and a substance selected from the group consisting of alkali salts of naphthol sulfonic acids and alkali salts of amino sulfonic acids of the benzene and naphthalene series, and heating the aqueous reaction mixture under reflux.

7. The water-soluble reaction product obtained by in-

TABLE III

| Leather test No. | Product test No. | Ratios of lignin to resin former to pHCHO to sulfanilate | Product | | Fatliquor | | Percent plumping | Temper | Grain | Break |
|---|---|---|---|---|---|---|---|---|---|---|
| | | | pH | Exhaustion | pH | Exhaustion | | | | |
| 1 | 1 | X:1:2:1 | 4.2 | Fair | 4.2 | Fair | 9.0 | M | S-M | T. |
| 2 | 2 | X:1:3:1 | 4.1 | ___do___ | 4.2 | Fair to Good | 11.5 | M-F | S-M | T. |
| 3 | 3 | X:1:4:1 | 4.1 | ___do___ | 4.4 | ___do___ | 9.0 | M-F | S-M | T. |
| 4 | Fatliquor control. | | | | | Complete | 0 | S-M | M | T. |

Symbols:
Temper: S-Soft; M-Mellow; F-Firm.
Grain: S-Smooth; M-Medium; D-Drawn.
Break: T-Tight; M-Medium; L-Loose.

teracting in an alkaline water solution alkali lignin with an amino compound selected from the group consisting of melamine, guanylurea, guanidine, urea and dicyandiamide; formaldehyde, and the sodium salt of sulfanilic acid, and heating the aqueous reaction mixture under reflux.

8. The water-soluble reaction product obtained by interacting in an alkaline water solution alkali lignin with an amino compound selected from the group consisting of melamine, guanylurea, guanidine, urea and dicyandiamide; formaldehyde, and the sodium salt of naphthionic acid, and heating the aqueous reaction mixture under reflux.

9. The water-soluble reaction product obtained by interacting in an alkaline water solution alkali lignin with an amino compound selected from the group consisting of melamine, guanylurea, guanidine, urea and dicyandiamide; formaldehyde, and the sodium salt of 5-amino-1-naphthalene sulfonic acid, and heating the aqueous reaction mixture under reflux.

10. The water-soluble reaction product obtained by interacting in an alkaline water solution alkali lignin with an amino compound selected from the group consisting of melamine, guanylurea, guanidine, urea and dicyandiamide; formaldehyde, and the sodium salt of 1-naphthol-4-sulfonic acid, and heating the aqueous reaction mixture under reflux.

11. The water-soluble reaction product obtained by interacting in an alkaline water solution alkali lignin with an amino compound selected from the group consisting of melamine, guanylurea, guanidine, urea and dicyandiamide; formaldehyde, and the soduim salt of 2-naphthol-6-sulfonic acid, and heating the aqueous reaction mixture under reflux.

12. The water-soluble reaction product obtained by interacting in an alkaline water solution alkali lignin with dicyandiamide, paraformaldehyde and the sodium salt of sulfanilic acid, and heating the aqueous reaction mixture under reflux.

13. The water-soluble reaction product obtained by interacting in an alkaline water solution 426 grams of an alkali lignin with one mol of an amino compound selected from the group consisting of melamine, guanylurea, guanidine, urea and dicyandiamide; at least two mols of a polymer of formaldehyde and one mol of a substance selected from the group consisting of alkali salts of naphthol sulfonic acids and alkali salts of amino sulfonic acids of the benzene and naphthalene series, and heating the aqueous reaction mixture under reflux.

14. The method of preparing water-soluble reaction products which comprises interacting in an alkaline water solution an alkali lignin with an amino compound selected from the group consisting of melamine, guanylurea, guanidine, urea and dicyandiamide; formaldehyde, and a substance selected from the group consisting of alkali salts of naphthol sulfonic acids and alkali salts of amino sulfonic acids of the benzene and naphthalene series in the proportion of 426 grams of the alkali lignin with one mol of the amino compound, and at least two mols of formaldehyde and one mol of said substance, and heating the aqueous reaction mixture under reflux until the reaction product remains clear on diluting it with water and acidifying.

15. The method of preparing water-soluble reaction products which comprises interacting in an alkaline water solution an alkali lignin with an amino compound selected from the group consisting of melamine, guanylurea, guanidine, urea and dicyandiamide; formaldehyde, and a substance selected from the group consisting of alkali salts of naphthol sulfonic acids and alkali salts of amino sulfonic acids of the benzene and naphthalene series in the proportion of 426 grams of the alkali lignin with one mol of the amino compound, and at least two mols of formaldehyde and one mol of said substance, and heating the aqueous reaction mixture until the reaction product remains clear on diluting it with water and acidifying.

References Cited in the file of this patent

UNITED STATES PATENTS

| | | |
|---|---|---|
| 2,552,129 | Windus | May 8, 1951 |
| 2,701,749 | Nagy | Feb. 8, 1955 |
| 2,802,815 | Doughty | Aug. 13, 1957 |
| 2,934,531 | Gordon et al. | Apr. 26, 1960 |

UNITED STATES PATENT OFFICE
CERTIFICATE OF CORRECTION

Patent No. 3,121,709                                February 18, 1964

Lothar Engelmann

It is hereby certified that error appears in the above numbered patent requiring correction and that the said Letters Patent should read as corrected below.

Column 3, TABLE I, column 3, line 4 thereof, for "9/10" read -- 9/16 --; same table, same column, line 6 thereof, for "3/10" read -- 3/16 --; column 5, line 19, for "of" read -- to --.

Signed and sealed this 11th day of August 1964.

(SEAL)
Attest:

ERNEST W. SWIDER
Attesting Officer

EDWARD J. BRENNER
Commissioner of Patents